Feb. 8, 1938.  L. B. WILSON  2,107,434
WELDROD
Filed July 13, 1933

INVENTOR
Lincoln B. Wilson
BY
ATTORNEY

Patented Feb. 8, 1938

2,107,434

UNITED STATES PATENT OFFICE 2,107,434

WELDROD

Lincoln B. Wilson, Barberton, Ohio, assignor to The Babcock & Wilcox Company, Newark, N. J., a corporation of New Jersey Application July 13, 1933, Serial No. 680,183

6 Claims. (Cl. 219—8)

This invention refers to covered or coated electrodes for use in fusion welding of the character wherein arc deposited metal is protected from the formation of oxides and nitrides by an excluding gaseous envelope and slag deposition.

Covered or coated rods of the prior art for the above class of welding depend upon materials which result in a weldrod coating which is of a fragile character, being frangible and/or friable in physical characteristics with the result that, in order to maintain the integrity and continuity of the covering or coating the rods must be carefully packed and handled and may not be bent without some injury to the covering or coating.

Inasmuch as it is often desirable to bend the rod for use in service, coverings have been devised incorporating fibrous or cellulosic materials which impart to the covering the ability to retain the same in place despite its fracture but, nevertheless, the integrity of the same is interrupted by checks, cracks and looseness of pieces with the result that the covering is then not uniform.

The present invention has, as an object thereof, a covering or coating of plastic character permitting bending of the covered or coated rod with substantially no destruction of the integrity of the covering or coating.

The weldrod of the present invention may also have the required degree of flexibility and plasticity of the covering, and of the rod as a whole, to permit it to be wound upon reels and used with automatic feed continuous welding machines.

It is also a feature of the present invention that the extraction of moisture from the covering by heat does not materially alter the flexible and plastic characteristics of the weldrod covering.

A further point resides in the utilization of an organic nitrogen-free non-cellulosic gum or resin-like substance, or substances, to impart the characteristics of flexibility and plasticity to the covering, but of such a nature and in such proportions that these substances are not detrimental to the welding operation either from the standpoint of gases produced or porosity of the weld metal in the proportions utilized.

Figure 1:
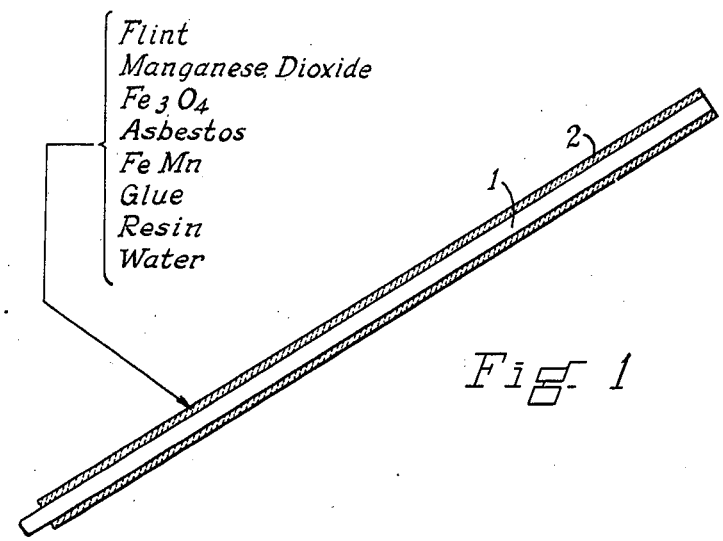
Figure 2:
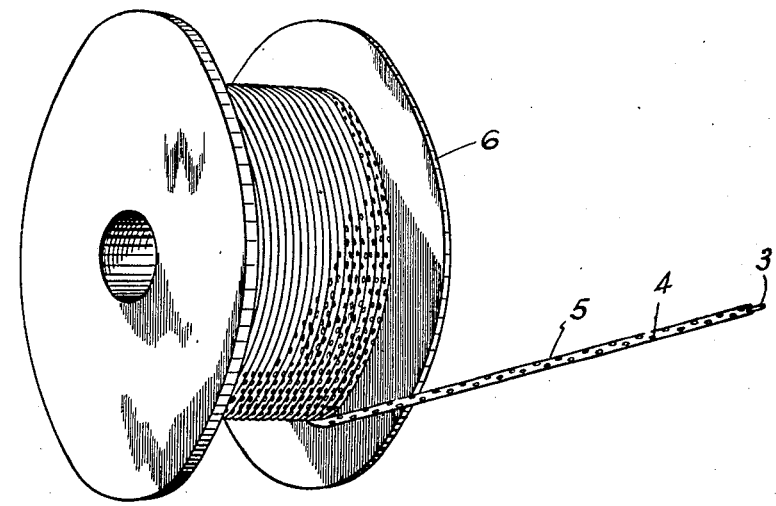

With the above, and other features in view, I will now describe one example of a specific covering according to the present invention as applied to weldrods of the different types for both hand and automatic welding, reference being made to the accompanying drawing forming a part of this specification and in which:

Fig. 1 is a view of a weldrod, partly in section, having a heavy covering of the present invention applied thereto; and Fig. 2 is a view of another type of electrode having the covering applied thereto, and with the electrode in long lengths wound upon a reel for use with automatic continuous welding.

In connection with Fig. 1, the metal core of the weldrod is indicated at 1 and the heavy flexible plastic covering at 2.

The covering 2, by way of specific formula to illustrate the invention is compounded of the following dry ingredients in the proportions named:

| | Grams |
|---|---|
| Flint (100 mesh) | 150 |
| Manganese dioxide | 75 |
| $Fe_3O_4$ | 75 |
| Asbestos | 30 |
| FeMn (Standard 80) | 60 |

Preferably the foregoing ingredients are in pulverized form and mixed dry, the following compound is then formed with ingredients in the proportions set forth:

| | Per cent |
|---|---|
| Above mixture | 77½ |
| Water soluble glue | 3 |
| Water soluble organic substance (resin) | 3½ |
| Water | 16 |

If desirable the water, glue and resin may first be combined to form a solution to which the mixture of mineral compounds is added to form the plastic mass.

The plastic mass thus formed is then molded about the core 1 as indicated at 2 by any suitable process such as extrusion or the like and is of a character and consistency suitable for adherence to the rod.

The rod and covering are then heated for the manifold purpose of dehydrating the covering, agglutinating the ingredients thereof, and further bonding the covering to the rod.

In Fig. 2 I have illustrated the application of the covering to a weldrod of the type set forth in the co-pending application of James E. Trainer, filed October 11, 1932, Serial No. 637,234, wherein the core 3 is deformed to provide projections 4 of bare metal through which the electric current for welding is supplied to the rod. The covering is indicated at 5 as filling in between the contact projections 4 to the depth of the side walls of the projections whereby the rod is of uniform cross sectional area throughout. The weldrod is shown coiled upon a reel 6 as is permitted by the elastic, plastic and flexible character of the covering and which consequently adapts the same for use with arc welding machines of the continuous type.

It is also obvious that the weldrod shown in Fig. 1 may be coiled by reason of the character of its covering.

In the foregoing formula the mixture is predicated upon a ratio of reducing materials (oxygen absorbing) to oxidizing materials (oxygen liberating) with added organic material in the form of resin and glue having the effect of increasing the reducing materials and, more particularly stated with regard to the formula herein disclosed the added glue and resin supplement the reducing effect of the ferromanganese.

It is also advantageous to use, as the resin a double boric acid compound of glycol, known as glycol bori-borate, produced by treating dihydric alcohol with boric acid in the presence of a catalytic agent; the said product being an inorganic acid ester of an organic compound having the property of a hygroscopic, non-drying plasticizing agent below 275° F. at which point it becomes a solid resin glass slightly soluble in water. The product as used for the mixture is a glycol or glycerine solution.

While in the foregoing I have described specific embodiments of the invention, it is nevertheless understood that in carrying the invention into practice I may resort to any and all modifications falling within the scope of the appended claims defining the invention.

I claim—

1. In a weldrod, a flexible metal core, and an enshrouding covering containing a metallic compound, and a nitrogen-free gum or resin-like component in an amount sufficient to render the covering cold plastic to a degree permitting bending through at least ninety degrees without separation of core and covering.

2. In a weldrod, a flexible metal core, and an enshrouding covering containing a metallic compound and a water soluble nitrogen-free gum or resin-like component in an amount sufficient to render the covering cold plastic to a degree permitting bending to at least ninety degrees without separation of core and covering.

3. In a weldrod, a flexible metal core, and an enshrouding covering containing a metallic compound, a water soluble binder, and at least one nitrogen-free gum or resin-like ingredient in an amount sufficient to render the covering cold plastic to a degree permitting bending to at least ninety degrees without separation of core and covering.

4. In a weldrod, a flexible metal core, and an enshrouding covering containing a metallic compound mixture with a dehydrated, water soluble, nitrogen-free gum or resin-like substance in an amount sufficient to render the covering cold plastic to a degree permitting bending to at least ninety degrees without separation of core and covering.

5. In a weldrod, a flexible metal core, and an enshrouding covering comprising a metallic compound mixture in an inorganic ester of an organic compound, hygroscopic, non-drying at temperatures below 270° F. and rendering the covering plastic to a degree permitting bending to at least ninety degrees without separation of core and covering.

6. A weldrod coating mixture of mineral ingredients 77½% approximately, water soluble glue approximately 3%, water soluble organic cold plastic resin 3½%, and water 16%.

LINCOLN B. WILSON.